US012663051B1

(12) United States Patent
Ackeifi

(10) Patent No.: US 12,663,051 B1
(45) Date of Patent: Jun. 23, 2026

(54) APPARATUS AND METHOD FOR ENCAPSULATING A DISC SPRING ASSEMBLY IN AN INSULATED PACKAGE

(71) Applicant: Envision Energy USA Ltd., Burlington, MA (US)

(72) Inventor: Ross Ackeifi, Revere, MA (US)

(73) Assignee: Envision Energy USA Ltd., Burlington, MA (US)

( * ) Notice: Subject to any disclaimer, the term of this patent is extended or adjusted under 35 U.S.C. 154(b) by 0 days.

(21) Appl. No.: 19/346,857

(22) Filed: Oct. 1, 2025

(51) Int. Cl.
 *F16F 1/02* (2006.01)
 *F16F 1/32* (2006.01)
(52) U.S. Cl.
 CPC ............... *F16F 1/024* (2013.01); *F16F 1/32* (2013.01); *F16F 2226/04* (2013.01); *F16F 2230/0023* (2013.01)
(58) Field of Classification Search
 CPC .......... F16F 1/024; F16F 1/32; F16F 2226/04; F16F 2230/0023; B65B 63/02
 See application file for complete search history.

(56) References Cited

FOREIGN PATENT DOCUMENTS

| CN | 210182152 U | * | 3/2020 | |
| CN | 111874296 A | * | 11/2020 | ............. B65B 63/02 |
| CN | 217589028 U | * | 10/2022 | |
| RU | 2014111362 A | | 10/2015 | |

* cited by examiner

*Primary Examiner* — Lee A Holly
(74) *Attorney, Agent, or Firm* — CALDWELL LLC

(57) ABSTRACT

An apparatus for encapsulating a disc spring assembly in an insulated package, wherein the apparatus includes at least a disc spring assembled in a cylindrical stack; an internal guide bushing passing through a center of the at least a disc spring, wherein the internal guide bushing is configured to constrain the at least a disc spring; a first end bushing and a second end bushing, wherein each of the first end bushing and the second end bushing includes a circumferential groove, wherein a top portion of the at least a disc spring is abutting against the first end bushing, and wherein a bottom portion of the at least a disc spring is abutting against the second end bushing; and an insulation layer, wherein the insulation layer is configured to encapsulate the at least a disc spring and at least a portion of the first and the second end bushings.

29 Claims, 5 Drawing Sheets

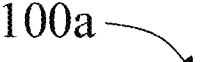
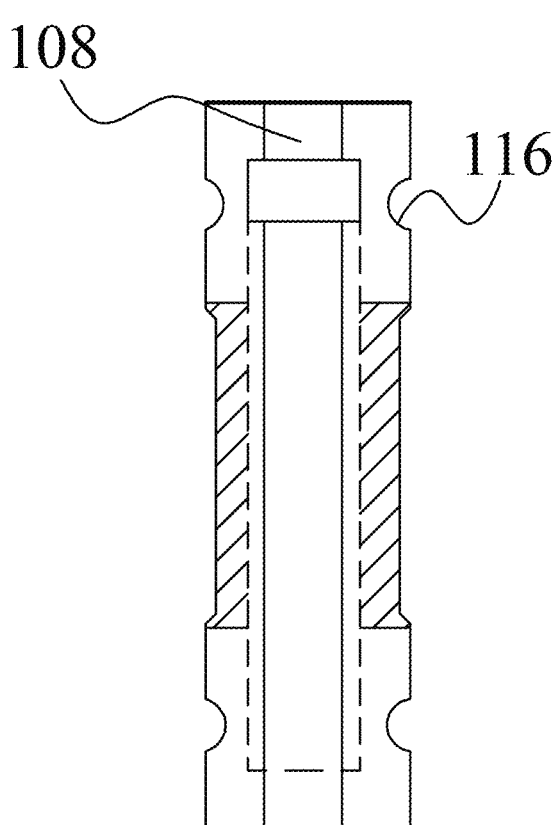
FIG. 1A

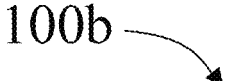
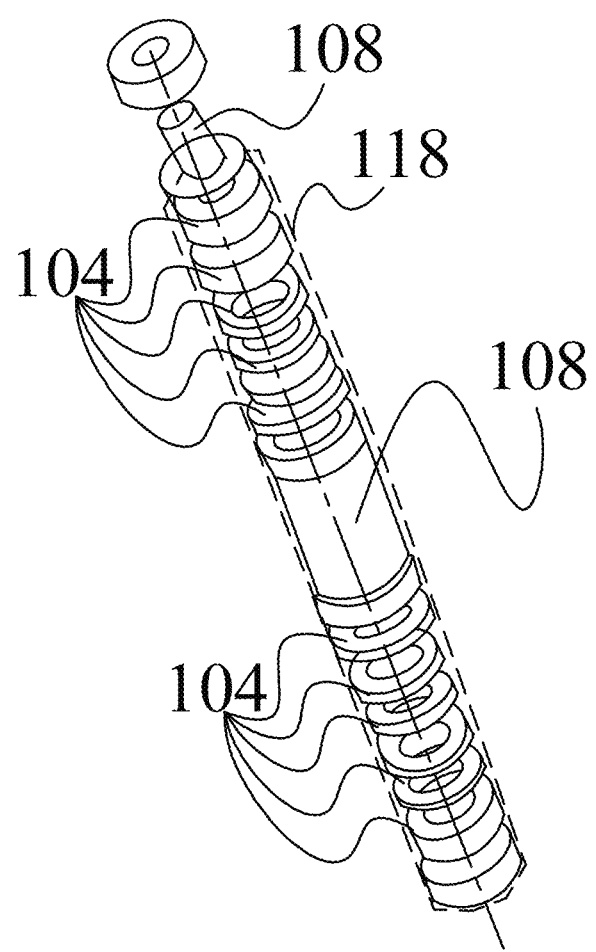
FIG. 1B

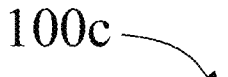
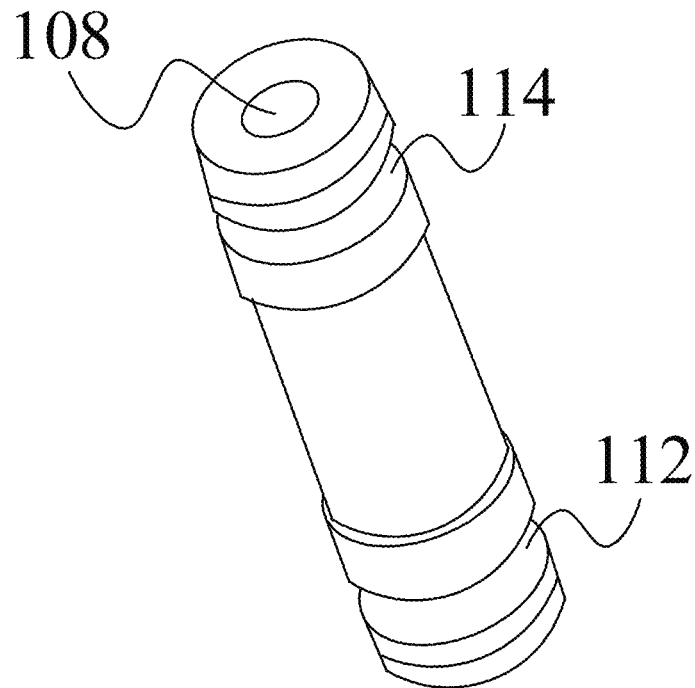
FIG. 1C

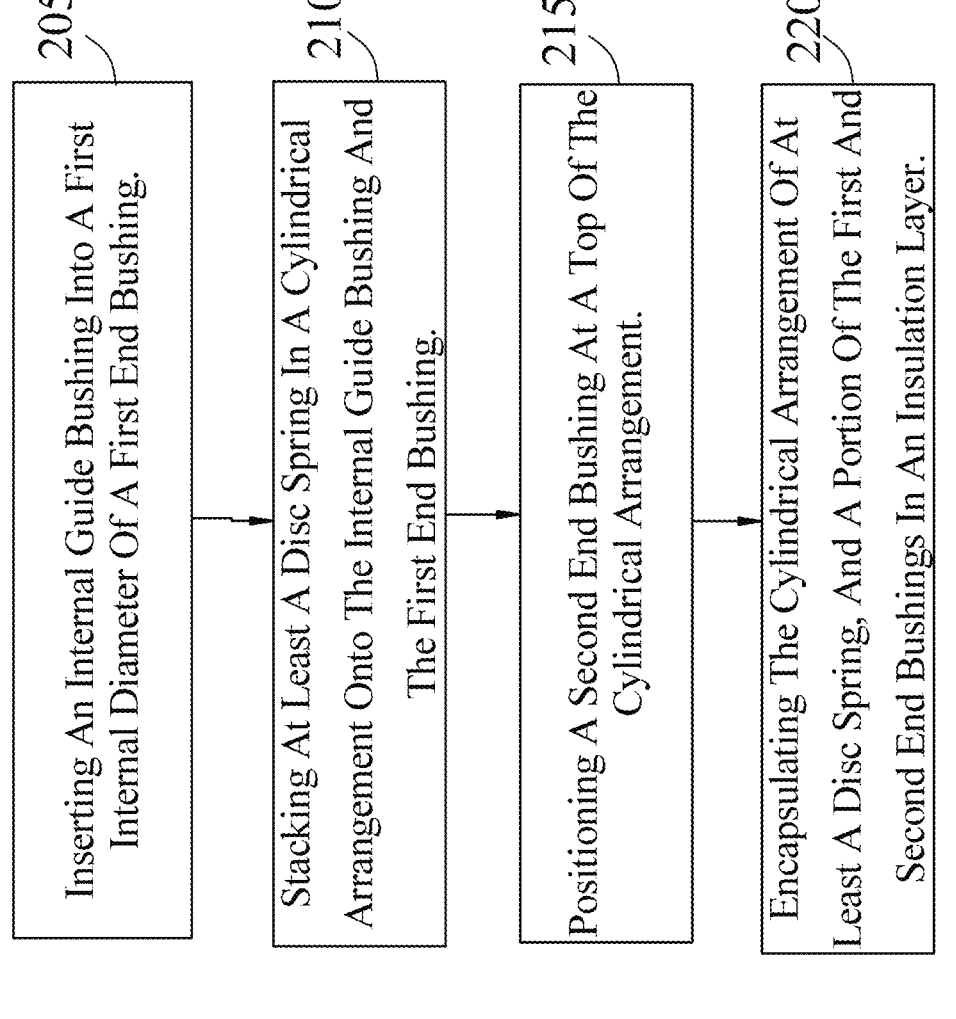

200

205 Inserting An Internal Guide Bushing Into A First Internal Diameter Of A First End Bushing.

210 Stacking At Least A Disc Spring In A Cylindrical Arrangement Onto The Internal Guide Bushing And The First End Bushing.

215 Positioning A Second End Bushing At A Top Of The Cylindrical Arrangement.

220 Encapsulating The Cylindrical Arrangement Of At Least A Disc Spring, And A Portion Of The First And Second End Bushings In An Insulation Layer.

FIG. 2

APPARATUS AND METHOD FOR ENCAPSULATING A DISC SPRING ASSEMBLY IN AN INSULATED PACKAGE

FIELD OF THE INVENTION

The present invention generally relates to the field of mechanical load management. In particular, the present invention is directed to an apparatus and method for encapsulating a disc spring assembly in an insulated package.

BACKGROUND

Traditional mechanical load management assemblies present several challenges. The assembly process can be intricate and time-consuming, requiring careful placement and alignment of each individual component to ensure proper function and load distribution. Handling these high-force components can be hazardous, especially if the assembly suddenly disassembles due to improper handling or misalignment. Additionally, traditional mechanical load management assemblies are open to the environment, leading to corrosion and wear over time, necessitating frequent maintenance and replacement.

SUMMARY OF THE DISCLOSURE

An apparatus for encapsulating a disc spring assembly in an insulated package, wherein the apparatus includes at least a disc spring assembled in a cylindrical stack; an internal guide bushing passing through a center of the at least a disc spring, wherein the internal guide bushing is configured to constrain the at least a disc spring; a first end bushing and a second end bushing, wherein each of the first end bushing and the second end bushing includes a circumferential groove, wherein a top portion of the at least a disc spring is abutting against the first end bushing, and wherein a bottom portion of the at least a disc spring is abutting against the second end bushing; and an insulation layer, wherein the insulation layer is configured to encapsulate the at least a disc spring and at least a portion of the first and the second end bushings.

A method for encapsulating a disc spring assembly in an insulated package, the method includes inserting an internal guide bushing into a first internal diameter of a first end bushing; stacking at least a disc spring in a cylindrical arrangement onto the internal guide bushing and the first end bushing; positioning a second end bushing at a top of the cylindrical arrangement; and encapsulating the cylindrical arrangement of at least a disc spring and at least a portion of the first and the second end bushings in an insulation layer.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 1A-C illustrate an apparatus for encapsulating a disc spring assembly in an insulated package;

FIG. 2 is a block diagram of an exemplary method for encapsulating a disc spring assembly in an insulated package.

DETAILED DESCRIPTION

Figures 3A, 3B, 3C, 3D:
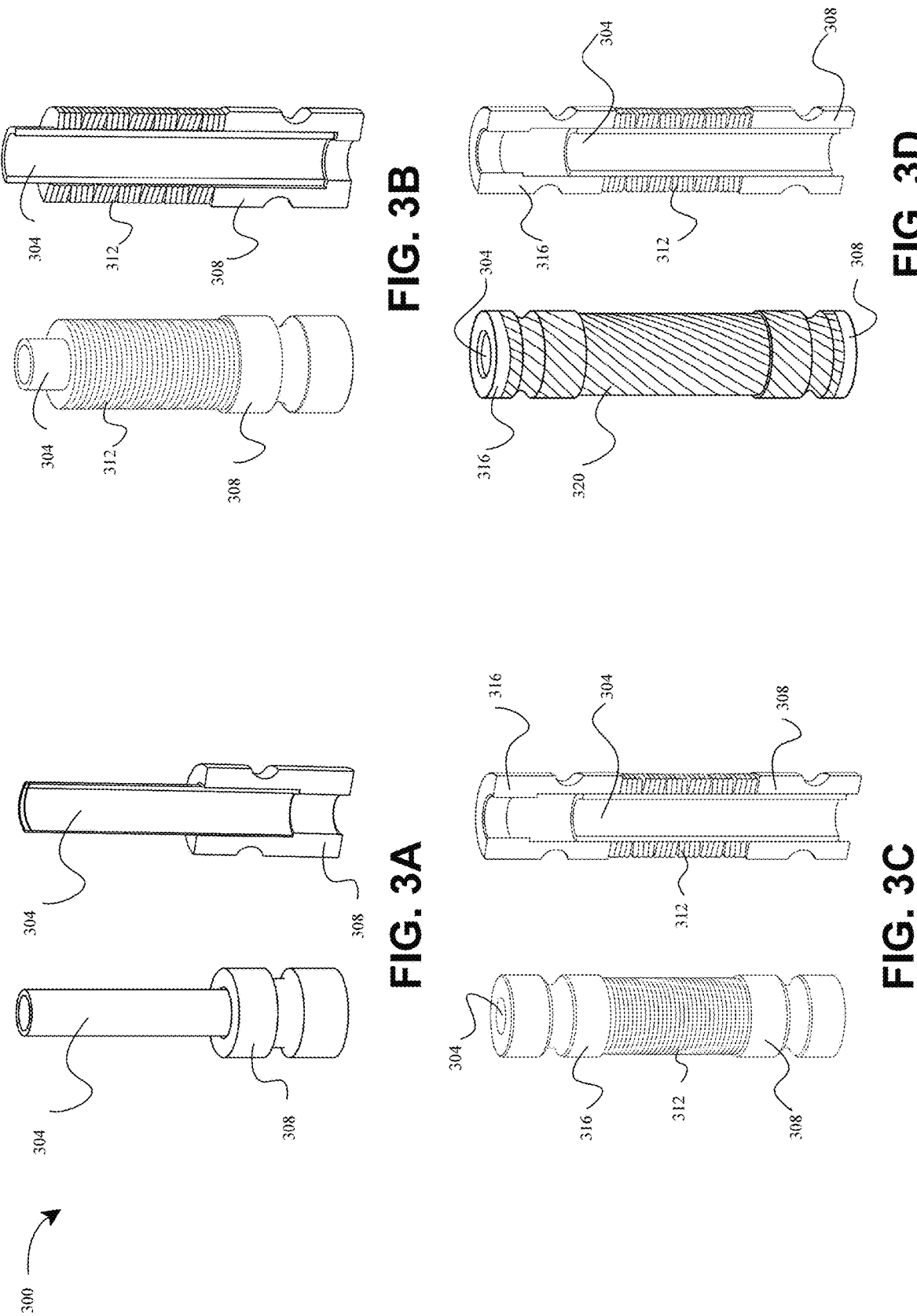
FIGS. 3A-D are schematic diagrams for encapsulating a disc spring assembly in an insulated package.

At a high level, aspects of the present disclosure are directed to an apparatus for encapsulating a disc spring assembly in an insulated package, wherein the apparatus includes at least a disc spring assembled in a cylindrical stack; an internal guide bushing passing through a center of the at least a disc spring, wherein the internal guide bushing is configured to constrain the at least a disc spring; a first end bushing and a second end bushing, wherein each of the first end bushing and the second end bushing includes a circumferential groove, wherein a top portion of the at least a disc spring is abutting against the first end bushing, and wherein a bottom portion of the at least a disc spring is abutting against the second end bushing; and an insulation layer, wherein the insulation layer is configured to encapsulate the at least a disc spring and at least a portion of the first and the second end bushings.

Referring now to the drawings, FIG. 1A-C, apparatus 100*a-c* for encapsulating a disc spring assembly in an insulated package. Apparatus 100*a-c* includes at least a disc spring 104 assembled in a cylindrical stack; an internal guide bushing 108 passing through a center of the at least a disc spring 104, wherein the internal guide bushing 108 is configured to constrain the at least a disc spring 104; As used in this disclosure, a "cylindrical stack" is a configuration where multiple components are arranged in a vertical column or stack. In a non-limiting example, the cylindrical stack may include at least a disc spring 104, such as Belleville washers. Continuing, the at least a disc spring 104 may be arranged in a vertical column or stack within a cylindrical form. Continuing, this arrangement may allow the springs to collectively provide the desired mechanical properties, such as load-bearing capacity and deflection characteristics, tailored to specific application requirements. As used in this disclosure, "internal diameter" (ID) is the measurement of the distance across the interior of a circular object or component. In a non-limiting example, the circular object or component may be a tubing, a pipe, a cylinder, a ring, and or the like. As used in this disclosure, an "internal guide bushing" is a cylindrical component that provides alignment and support for mechanical parts. In a non-limiting example, the internal guide bushing 108 may provide alignment and support for the at least a disc spring 104 within the assembly. Without limitation, the internal guide bushing 108 may serve as a guide to ensure that the components move along a defined path and maintain proper alignment, reducing wear and tear caused by misalignment or lateral movement. Without limitation, the internal guide bushing 108 may be made of durable and resilient materials, such as stainless steel or reinforced polymers, to withstand mechanical stresses and environmental conditions encountered in electrolyzer applications. Continuing, internal guide bushing 108 material choice may ensure that the internal guide bushing 108 can maintain structural integrity while providing precise alignment and linear constraint for the at least a disc spring 104 within the assembly. The internal guide bushing 108 contributes to precise pressure adjustments and reliable mechanical support within the assembly. Without limitation, the internal guide bushing 108 may pass through the inner diameter (ID) of the at least a disc spring 104, which may be constrained by an internal guide bushing 108 shaped like a pipe as discussed in more detail below. Continuing, this configuration may ensure the at least a disc spring 104 remain properly aligned and that the at least a disc spring 104 can accommodate mechanical loads effectively. Without limitation, the internal guide bushing 108 may act as the central axis for the at least a disc spring 104 and promote consistent load distribution to enhance the assembly's stability. In one or more embodiments, a disc spring 104 assembly may be configured with an internal guide bushing 108 disposed through the central aperture of each disc spring 104. In one embodiment, an internal guide bushing 108 may serve to retain a stack of at least a disc spring 104 in a series configuration. In one embodiment, an internal guide bushing 108 may serve to retain a stack of at least a disc spring 104 in in a parallel configuration. In one or more embodiments, an internal guide bushing 108 may be cylindrical in shape and may pass concentrically through the internal diameter of each disc spring 104 in the stack. This configuration may ensure proper orientation and axial alignment of the springs during compression and loading. In an embodiment, a shaft may be used when rotational rigidity or torque transmission is required, such as in applications involving dynamic motion or integrated mechanical drives. In an embodiment, a bolt may be used as the internal guide bushing 108, wherein the threaded section engages with a complementary nut or mounting structure to apply and maintain preload in the assembly. In an embodiment, a plain rod may be used purely for alignment and structural containment of the spring disc stack. Additionally, in mechanical systems where overload or impact protection may be needed, the disc spring 104 assembly, maintained by the internal guide bushing 108, may function as a buffer to distribute excessive force and prevent damage to sensitive hardware components. In one or more embodiments, an internal guide bushing 108 may provide a central structural axis around which disc spring 104 assemblies may be organized, constrained, and functionally optimized. In a non-limiting example, the internal guide bushing 108 may be designed to accommodate the internal guide bushing 108 to pass through its internal diameter, ensuring proper alignment and facilitating the smooth operation of the disc spring 104 assembly under load.

Still referring to FIG. 1A-C, apparatus 100a-c includes a first end bushing 112 and a second end bushing 114, wherein each of the first end bushing and the second end bushing comprises a circumferential groove 116, wherein a top portion of the at least a disc spring 104 is abutting against the first end bushing 112, and wherein a bottom portion of the at least a disc spring 104 is abutting against the second end bushing 114. As used in this disclosure, an "end bushing" is a component used within a mechanical assembly to reduce friction and wear between moving parts in machinery. In some embodiments, an end bushing may be positioned at the topmost and/or bottommost part of an assembly. In a non-limiting example, the end bushing may provide support, alignment, and protection for the at least a disc spring 104. Without limitation, the end bushing may be positioned at both ends of a stack of at least a disc spring 104 and play a critical role in maintaining the structural integrity and functionality of the assembly. As used in this disclosure, a "circumferential groove" is a circular indentation or channel that is machined or molded around the outer surface of a component. In a non-limiting example, the end bushing may include one or more circumferential groove 116.

With continued reference to FIG. 1A-C, insulation layer 118 may be captured by the circumferential groove 116 in each end bushing providing a capture force during initial assembly of the disc spring 104 assembly. As used in this disclosure, "capture force" refers to the force exerted by a material or mechanism that securely holds or constrains components in place. Without limitation, the capture force may be the force generated by the shrink tubing as it contracts around the components when heated, effectively binding and stabilizing the at least a disc spring 104 within the assembly. Without limitation, when the insulation shrink tubing is applied and heat is introduced, the insulation shrink tubing may contract around the components and exert a uniform compressive force to securely bind the at least a disc spring 104 and associated components within the assembly. Continuing, this contraction force may create a firm and stable structure, minimizing the risk of disassembly or movement during handling or transportation. Without limitation, the captured components may remain tightly constrained.

With continued reference to FIG. 1A-C, the capture force may be resistant to any acceleration of the disc spring 104 assembly. In a non-limiting example, the capture force may ensure that the entire assembly retains its intended configuration and functionality throughout its operational lifecycle. Continuing, the capture force also contributes to the overall durability and reliability of the disc spring 104 assembly by preventing individual components from shifting or becoming misaligned, which may lead to performance issues or failures. In another non-limiting example, the circumferential groove 116 in the first end bushing 112 and second end bushing 114 of the assembly may be designed to increase the capture force by providing a mechanical lock for the insulation layer 118. For example, without limitation, as the insulation shrink tubing contracts, the insulation shrink tubing may fit snugly into the circumferential grooves, creating a physical barrier that further secures the components and prevents axial movement. Continuing, this method of leveraging the capture force may maintain the structural integrity of the assembly and may simplify the handling process by ensuring that the package can be easily gripped and manipulated without risking accidental disassembly. Without limitation, the circumferential grooves may offer a convenient handling aid that allows assemblers to confidently transport and position the assembly while maintaining safety and precision. In one or more embodiments, capture force provided by an insulation layer 118 may be maintained after repeated compression and decompression cycles and resists lateral loads, vibration, and shocks encountered during shipping, handling, and installation, without materially influencing a compression characteristics of at least a disc spring 104.

With continued reference to FIG. 1A-C, the pair of first end bushing 112 and second end bushing 114 may be configured to resist unwanted deflection by compression of the at least a disc spring 104 into a surface of the pair of end bushing. As used in this disclosure, the "surface" is the flat areas of the first end bushing 112 and second end bushing 114 that come into contact with other components within the assembly. Without limitation, the first end bushing 112 and second end bushing 114 may be configured to resist unwanted deflection caused by the compression of the at least a disc spring 104, ensuring that the mechanical forces are evenly distributed across the assembly. For example, without limitation, in an electrolyzer system where precise mechanical pressure is necessary for optimal performance, the first end bushing 112 and second end bushing 114 may interface with the at least a disc spring 104 and their mounting surfaces, such as structural components or retaining mechanisms. Continuing, this interface may allow the first end bushing 112 and second end bushing 114 to absorb and redirect forces, preventing excessive deformation or misalignment that could compromise the system's functionality. In another non-limiting example, the first end bushing 112 and second end bushing 114 may be applied in high-pressure industrial applications where the at least a disc spring 104 may be subject to variable loads and environmental conditions. Continuing, the first end bushing 112 and second end bushing 114 may act as a buffer between the at least a disc spring 104 and the mounting surfaces, effectively managing the mechanical stress to prevent damage or failure. Continuing, this design may ensure that the at least a disc spring 104 maintain their integrity and performance over time, reducing the need for frequent maintenance or replacements.

With continued reference to FIG. 1A-C, the internal guide bushing 108 may be configured to align the at least a disc spring 104. For example, without limitation in an electrolyzer assembly, the internal guide bushing 108 may ensure that the at least a disc spring 104 remain properly aligned within the cylindrical stack, preventing any lateral movement which may lead to uneven load distribution and mechanical failure. This precise alignment is crucial for maintaining consistent pressure on the MEAs, thereby optimizing the electrolyzer's performance.

With continued reference to FIG. 1A-C, at least a disc spring 104 may be arranged in a specific orientation to achieve a stiffness value and a load value. As used in this disclosure, "specific orientation" refers to the deliberate arrangement or positioning of components. In a non-limiting example, at least a disc spring 104 may require a specific orientation to achieve desired mechanical or functional characteristics. As used in this disclosure, a "stiffness value" is the numerical measure that quantifies the resistance of an object or material to deformation when subjected to an external force. In a non-limiting example, the stiffness value may determine how much a structure or component will bend, stretch, or compress under load. For example, a stiffness value for the at least a disc spring 104 may be calculated with consideration to factors like material properties, spring dimensions, the specific arrangement of the springs, and the like. Without limitation, at least a disc spring 104 may have varying stiffness values that depend on the aforementioned parameters. Continuing, without limitation, typical stiffness values for individual at least a disc spring 104 may range from a few newtons per millimeter (N/mm) to several hundred N/mm. For example, a single disc spring 104 made from standard spring steel with an outer diameter of around 40 mm and a thickness of about 2 mm may have a stiffness value of approximately 100a-c N/mm. Continuing, when arranged in a stack, the overall stiffness of the assembly may be adjusted by altering the number of springs and their orientation (parallel or series configuration), allowing for a wide range of stiffness values to be achieved. Continuing, this flexibility in design enables engineers to tailor the stiffness and load-bearing capacity of the spring assembly to meet specific application requirements. As used in this disclosure, a "load value" is a quantitative measurement that represents the amount of force or weight applied to a component, structure, or system. In a non-limiting example, the load value may help determine the capacity and performance of materials and mechanical systems under various conditions. Without limitation, the average load value for at least a disc spring 104 arranged in a specific orientation may be determined by understanding the load capacity, stiffness, and deflection characteristics of the at least a disc spring 104. In a non-limiting example, the load capacity of a single disc spring 104 may vary significantly, often ranging from a few hundred newtons to several thousand newtons, depending on its design parameters. The stiffness, may be denoted as k, measures the force required to compress the disc spring 104 by a unit distance. Continuing, using Hooke's Law, the load F may be calculated as $F=k*\Delta x$, where $\Delta x$ is the deflection of the disc spring 104. Without limitation, when multiple springs are stacked, their total load capacity and stiffness may change. Continuing, stacking springs in parallel increases the load capacity, while stacking them in series may increase the deflection.

With continued reference to FIG. 1A-C, the at least a disc spring 104 may be configured to manage mechanical loads in a next higher assembly. As used in this disclosure, a "mechanical load" refers to the external force or forces applied to a mechanical system or structure, which can result in stress, deformation, or displacement. As used in this disclosure, a "next higher assembly" refers to the immediate larger system or component into which a given part or subassembly is integrated. In a non-limiting example, the next higher assembly may be the subsequent level of assembly that incorporates a specific part, allowing that part to function as intended within a larger mechanism or system.

Without limitation, the apparatus may be configured to streamline the quality control process through a more efficient testing approach. For example, without limitation, after the initial assembly of the apparatus, it may undergo a brief compression test to evaluate its ability to meet the desired travel and force requirements under simulated operational conditions. As used in this disclosure, a "compression test" is a procedure used to evaluate the mechanical properties of a material or assembly by applying a compressive force and measuring its response. This test assesses characteristics such as strength, stiffness, and elasticity, providing insights into how the material or component behaves under load. Without limitation, the apparatus may be advantageous because it incorporates features that facilitate testing without requiring specialized tools or fixtures. Continuing, the integrated design may allow for direct testing of the spring's compression behavior, including the effects of hysteresis, which may be typically challenging to assess in traditional setups.

Additionally, and alternatively, the ability to conduct the compression tests without added fixturing is a significant improvement over traditional disc spring testing methods, which often involve complex setups to measure the spring's load-deflection characteristics accurately. Continuing, the integrated package design enables a straightforward pass/fail evaluation based on how closely the measured compression curve aligns with the desired performance metrics during both loading and unloading phases. Continuing, this approach may reduce the time and resources required for quality control while providing a reliable measure of the spring's operational readiness.

Still referring to FIG. 1A-C, apparatus 100a-c includes an insulation layer 118, wherein the insulation layer 118 is configured to encapsulate the at least a disc spring 104, and at least a portion of the first and the second end bushings. As used in this disclosure, an "insulation layer" is a material or component designed to prevent or reduce the transfer of heat, sound, or electricity between objects or environments. In a non-limiting example, the insulation layer 118 may exhibit specific mechanical properties, such as elasticity and compressive strength, which may allow it to provide structural support and protection to the at least a disc spring 104.

Without limitation, the insulation layer 118 may be designed to maintain rigidity under operational loads while accommodating the movement of the springs during compression and expansion cycles. In another non-limiting example, the insulation layer 118 may be manufactured using advanced materials such as thermoplastics or elastomers that are molded or extruded to form a shrink tubing. Continuing, during assembly, the insulation layer 118 may be applied over the disc spring 104 stack and then heated to shrink tightly around the components. Without limitation, and continuing the previous examples, this process may provide a secure and protective enclosure. In another non-limiting example, the insulation layer 118 may be made from high-performance polymers such as polyolefins, polyvinyl chloride (PVC), fiberglass, mineral wool, cellulose, polystyrene, polyurethane, or silicone rubber. Without limitation, insulation layer 118 may provide visual shielding to prevent the assembly from being easily reverse engineered. As used in this disclosure, a "disc spring" is a conically shaped mechanical component designed to manage mechanical loads in various applications. In a non-limiting example, the disc spring 104 may include a Belleville washer. In a non-limiting example, the disc spring 104 may be used for precise operational pressure adjustments and reliable mechanical support under varying thermal and chemical conditions. Without limitation, the disc spring 104 may provide the necessary flexibility and load characteristics needed for effective operation. For example, without limitation, in an electrolyzer stack, at least a disc spring 104 may be used to maintain consistent pressure on the membrane electrode assemblies (MEAs), ensuring optimal contact and performance. Without limitation, the disc spring 104 may accommodate thermal expansion and contraction, preventing mechanical stress and potential damage to the MEAs. Another non-limiting example, the disc spring 104 may serve as critical component in load-bearing and vibration-damping applications as discussed in more detail below. For instance, without limitation, at least a disc spring 104 may be used to absorb shock loads and reduce vibrations. Continuing, the disc spring 104 may provide high force in a small deflection range. Continuing, the resilience of at least a disc spring 104 under varying thermal and chemical conditions may prove ideal for use in harsh industrial environments, where they can withstand exposure to high temperatures, corrosive substances, and mechanical fatigue. In one or more embodiments, at least a disc spring 104 may be used to maintain sealing integrity and structural stability in electrochemical systems such as electrolyzers and fuel cells. In an embodiment, at least a disc spring 104 may provide a preload force that ensures constant contact between mating surfaces, thereby maintaining a robust seal throughout thermal and pressure fluctuations during operation. In an embodiment, electrolyzers may use at least a disc spring 104 to maintain mechanical pressure between cell layers, which is essential for maintaining hydrogen and oxygen production efficiency. In one or more embodiments, fuel cells may employ at least a disc spring 104 to maintain sealing pressure and prevent leakage of hydrogen and oxygen gases. In one or more embodiments, at least a disc spring 104 may be suitable for applications involving cyclic thermal loading and variable pressure environments. For example, and without limitation, in flanged vessels or piping systems used in industrial refineries, at least a disc spring 104 have historically been employed to compensate for thermal expansion and contraction. In one or more embodiments, at least a disc spring 104 may be used in electrolyzer and fuel cell stacks to provide consistent sealing force while accommodating dimensional changes caused by operational conditions. In one embodiment, at least a disc spring 104 may be configured in various stacking arrangements including but not limited to parallel, series, or combinations thereof. In one or more embodiments, at least a disc spring 104 may be manufactured from corrosion-resistant or high-performance materials such as stainless steel or nickel alloys to meet the chemical compatibility requirements of electrolytic or fuel cell environments. In one or more embodiments, disc spring 104 assembly may be used in a large-scale electrolyzer installation. In one or more embodiments, at least a disc spring 104 may offer several advantages in electrochemical cell stack applications, including but not limited to: (1) a high capacity to absorb thermal and pressure variations, thereby maintaining stable contact pressure and scaling performance; (2) the ability to handle high mechanical loads, making them suitable for both small and large industrial applications; and (3) improved distribution of mechanical load across the seal interface, reducing localized stress and extending service life of seals and components.

With continued reference to FIG. 1A-C, insulation layer 118 may include an insulative shrink tubing. As used in this disclosure, an "insulation shrink tubing" is a type of thermoplastic tubing that shrinks when heat is applied. In a non-limiting example, the insulation shrink tubing may provide insulation and protection for electrical connections and mechanical components within the assembly. In another non-limiting example, the insulation shrink tubing may be designed to encase and protect the assembly components from environmental factors, such as moisture, dust, abrasion, and the like. Without limitation, the insulation shrink tubing may provide electrical insulation, strain relief, and the like. In one or more embodiments, insulation shrink tubing may be employed to enclose and protect a disc spring 104 assembly, such as a stack of Belleville washers used in electrolyzers or fuel cells. In an embodiment, insulation shrink tubing may include a thermoplastic material that shrinks radially upon application of heat, conforming tightly to the shape of the enclosed components. When applied to a disc spring 104 assembly, the insulation shrink tubing may form a uniform and continuous protective barrier around the outer surface of the stacked at least a disc spring 104. This protective layer may shield the at least a disc spring 104 and associated internal guide components from external mechanical abrasion, particulate contamination, and exposure to moisture, thereby preserving the functional integrity of the spring system under harsh operational conditions. In one or more embodiments, insulation shrink tubing may be manufactured from materials selected based on the specific thermal and environmental requirements of the intended application. For example, polyolefin may be used as a shrink tubing material due to its ability to withstand high temperatures. In another embodiment, adhesive-lined polyolefin may be employed to ensure secure mechanical bonding between the tubing and the enclosed disc spring 104 assembly, providing enhanced sealing against moisture ingress and additional mechanical stability. In one or more embodiments a, polyvinyl chloride (PVC) may be selected for applications involving lower temperature thresholds, offering cost-effective abrasion resistance and flame-retardant properties. For example, and without limitations, thermoplastic materials may include polytetrafluoroethylene (PTFE), fluorinated ethylene propylene (FEP), elastomers, silicone rubber, and fluoroelastomers such as Viton®. In one or more embodiments, insulation shrink tubing may be positioned around the stacked at least a disc spring 104 and activated by applying localized heat, thereby causing the tubing to shrink and conform to the outer contour of the spring assembly. By protecting the at least a disc spring 104 within the encapsulated package, the insulation shrink tubing may enhance the operational longevity, safety, and performance reliability of the disc spring 104 system.

In a non-limiting example, insulation shrink tubing may be made from a heat-sensitive thermoplastic material that shrinks when heated. For instance, the insulation shrink tubing may be made from polyolefin. As used in this disclosure, "polyolefin" is a type of polymer produced from a simple olefin (also known as an alkene) as a monomer. Continuing, during manufacturing, the insulation shrink tubing may be extruded in an expanded state and then cross-linked to enhance its strength and elasticity. Without limitation, cross-linking refers to a process in polymer chemistry where chemical bonds are formed between polymer chains, creating a three-dimensional network. Continuing, the cross-linking process may enhance the material's properties by making it more rigid, durable, resistant to deformation, heat, chemical attack, and the like.

With continued reference to FIG. 1A-C, insulative shrink tubing may include polyvinyl chloride, polyethylene, and silicone rubber. As used in this disclosure, "polyvinyl chloride" (PVC) is a synthetic plastic polymer made from the polymerization of vinyl chloride monomers. Without limitation PVC may be versatile, durable, and cost-effective. As used in this disclosure, "polyethylene" (PE) is a thermoplastic polymer made from the polymerization of ethylene monomers. As used in this disclosure, "silicone rubber" is a rubber-like material composed of silicone. Without limitation, silicone is a polymer containing silicon, oxygen, carbon, and hydrogen. In a non-limiting example, "silicone rubber" may include high thermal stability and flexibility.

With continued reference to FIG. 1A-C, insulation layer 118 may be configured to accommodate transportation of the at least a disc spring 104 during operation. In a non-limiting example, the insulation layer 118 may encapsulate the at least a disc spring 104 in the insulation shrink tubing and prevent unintended disassembly or misalignment during handling and transport. In a non-limiting example, the insulation layer 118 may maintain the integrity and functionality of the disc spring 104 assembly throughout its operational life. Insulation layer 118 may be configured to mitigate sudden release of stored energy in the at least a disc spring 104.

With continued reference to FIG. 1A-C, insulation layer 118 may be configured to an encapsulate the at least a disc spring 104, the internal guide bushing 108 and the pair of first end bushing 112 and second end bushing 114. Heat may be applied to insulation layer 118 to shrink and constrain the cylindrical arrangement of apparatus 100.

With continued reference to FIG. 1A-C, wherein the next higher assembly may include an electrolyzer assembly. As used in this disclosure, an "electrolyzer assembly" is a system or unit that integrates various components required to perform electrolysis for the production of hydrogen from water. In one or more embodiments, an electrolyzer assembly May include, without limitation, one or more electrolysis cells, a power supply system, proton- or anion-exchange membranes, a water management system, and a gas separation subsystem, each operating in coordination to facilitate the efficient electrochemical splitting of water molecules into hydrogen and oxygen gases. In one or more embodiments, an electrolyzer assembly may further include one or more control modules, temperature regulation systems, and fluidic manifolds to ensure operational consistency and maintain system efficiency during continuous or variable load operation. In one or more embodiments, an electrolyzer assembly may include at least one disc spring 104 assembly, configured to apply and maintain mechanical preload across a stack of electrolysis cells or between adjoining mechanical components subject to sealing or structural compression. The disc spring 104 assembly, as previously described, may include a plurality of at least a disc spring 104 stacked in series and/or parallel and encapsulated in an insulation shrink tubing layer. In one embodiment, a disc spring 104 assembly may be positioned adjacent to or integrated within the compression plate or frame structure of the electrolyzer stack. In an embodiment, at least a disc spring 104 may provide compensatory force to maintain clamping pressure as components undergo thermal expansion, creep, or relaxation during extended operation. In an embodiment, an encapsulated disc spring package may also serve a protective function by shielding the springs from corrosive humid environments often present during electrolysis, particularly through the use of insulation shrink tubing made of thermally and chemically resistant materials such as polyolefin, PTFE, or fluorinated elastomers. In an embodiment, a disc spring 104 assembly may be mounted along a central axis via a collecting rod, such as a bolt, shaft, or plain rod, to preserve alignment and allow rapid preassembly and quality control verification prior to integration into a full electrolyzer system.

With continued reference to FIG. 1A-C, the at least a disc spring 104 may be configured to provide an operational pressure adjustment in the next higher assembly. As used in this disclosure, "operational pressure adjustment" is the process of regulating and modifying the pressure within a system or component to maintain optimal performance and ensure safe operation. Without limitation, the operational pressure adjustment may be crucial in systems that involve fluids or gases, where maintaining the correct pressure is necessary for efficiency, reliability, and safety. For example, in the next higher assembly, the electrolyzer assembly, the at least a disc spring 104 may be arranged to apply a consistent and adjustable pressure on the MEAs. Continuing, this pressure may ensure that the MEAs maintain optimal contact with the catalyst layers, thereby enhancing the efficiency of the electrolysis process. Continuing, by adjusting the number and orientation of the at least a disc spring 104, the pressure may be fine-tuned to accommodate different operational conditions, such as changes in temperature or gas production rates.

With continued reference to FIG. 1A-C, the at least a disc spring 104 may be configured to provide mechanical support under varying thermal conditions in the next higher assembly. As used in this disclosure, "thermal conditions" refer to the specific temperature environment or temperature-related factors affecting a system, component, or material. For example, without limitation, in the electrolyzer assembly, the at least a disc spring 104 may be designed to accommodate the thermal expansion and contraction of components due to temperature fluctuations. Continuing, this may prove particularly important in high-temperature electrolyzers, where the operating environment may cause significant thermal stress. Continuing, the ability of the at least a disc spring 104 to flex and adjust under these conditions may ensure that the MAEs and other critical components remain securely in place, preventing mechanical failure and maintaining optimal performance. In one or more embodiments, a disc spring 104 assembly may be configured to operate under a range of thermal conditions corresponding to various electrolyzer technologies. In an embodiment, a disc spring 104 assembly may be integrated into an alkaline water electrolyzer (AWE), which typically operates at temperatures below 100° C., and more commonly in the range of approximately 20° C. to 90° C. Commercial AWE systems may maintain an operating temperature near 80° C. In one or more embodiments, a disc spring 104 assembly may be used within proton exchange membrane (PEM) electrolyzer systems, which generally operate at intermediate temperatures between 50° C. and 80° C. In one or more embodiments, PEM configurations under research may operate at temperatures between ° C. and 200° C. In one or more embodiments, a disc spring 104 assembly may be employed in solid oxide electrolyzer cell (SOEC) systems, which operate at high temperatures, typically between approximately 700° C. and 900° C.

With continued reference to FIG. 1A-C, the at least a disc spring 104 may be configured to provide mechanical support under varying chemical conditions in the next higher assembly. As used in this disclosure, "chemical conditions" refer to the specific environmental factors and parameters related to the chemical composition and reactions occurring in a particular setting. For example, and without limitation, particular setting may include electrolyzer related environment (e.g., alkaline water electrolyzer, proton exchange membrane (PEM) electrolyzer systems, solid oxide electrolyzer cell (SOEC) systems). Continuing, these conditions may influence the behavior, interactions, and stability of substances within a given environment.

With continued reference to FIG. 1A-C, a connecting rod may be used in the next higher assembly. As used in this disclosure, a "connecting rod" is a mechanical component that serves as a link between different parts of a system. In a non-limiting example, the connecting rod may be used to transmit motion and force within the system. In another non-limiting example, the connecting rod may be part of a disc spring 104 assembly within an electrolyzer system. Without limitation, the connecting rod may help maintain alignment and structural integrity under mechanical loads. In a non-limiting example, the connecting rod may facilitate the conversion of linear motion to rotational motion or vice versa, depending on the system's requirements. The connecting rod contributes to precise pressure adjustments and reliable mechanical support within the assembly. In one or more embodiments, the use of a connecting rod may also aid in vibration damping and energy dissipation, as the controlled movement and friction between springs during loading can absorb shocks and reduce transmission of dynamic loads. Continuing, the materials used also help protect the bushing from corrosion, wear, and deformation, thereby enhancing the longevity and reliability of the spring assembly in dynamic and harsh operating environments.

With continued reference to FIG. 1A-C, the at least a disc spring 104 may include conical at least a disc spring. As used in this disclosure, "conical at least a disc spring," are mechanical components with a conical shape designed to handle axial loads in a compact space. Without limitation, conical at least a disc spring may include Belleville washers. Continuing, these springs may be configured to exert high forces within a limited deflection range.

With continued reference to FIG. 1A-C, at least a disc spring 104 may include wave at least a disc spring. As used in this disclosure, "wave at least a disc spring" are a type of spring that consists of a flat, circular, and corrugated or wavy design. Without limitation, unlike traditional at least a disc spring, which are conical, wave at least a disc spring have a series of waves or curves along their radial axis. This design may provide flexibility and resilience, allowing them to absorb loads and compensate for misalignments or thermal expansions in mechanical systems.

With continued reference to FIG. 1A-C, the internal guide bushing 108 may include one or more of steel, aluminum, and plastic material. As used in this disclosure, "steel" is an alloy primarily composed of iron and carbon, along with other elements. In a non-limiting example, the other elements may include manganese, chromium, nickel, and vanadium, which enhance its properties. As used in this disclosure, "aluminum" is a silvery-white, lightweight, and highly versatile metal. As used in this disclosure, "plastic" is a term that refers to a wide range of synthetic or semi-synthetic materials made from polymers, which are large molecules composed of repeating structural units.

With continued reference to FIG. 1A-C, the first end bushing 112 and second end bushing 114 may be positioned between the at least a disc spring 104 and a mounting surface and a nut. As used in this disclosure, a "mounting surface" is a flat or contoured plane designed to support and secure components or assemblies in place. As used in this disclosure, a "nut" is a type of fastener with a threaded hole, designed to mate with a bolt or screw to secure components together.

With continued reference to FIG. 1A-C, the first end bushing 112 and second end bushing 114 may provide load distribution, friction reduction, leakage prevention, and vibration dampening. As used in this disclosure, "load distribution" refers to the process of spreading or sharing a load or force evenly across a surface or structure to prevent localized stress and potential damage. As used in this disclosure, "friction reduction" refers to the process of minimizing resistance between two surfaces that are in contact and moving relative to each other. As used in this disclosure, "leakage prevention" refers to the methods and techniques used to prevent the escape of fluids or gases from a system or component. As used in this disclosure, "vibration dampening" refers to the process of reducing or eliminating unwanted vibrations in a mechanical system or structure.

With continued reference to FIG. 1A-C, the first end bushing 112 and second end bushing 114 may be configured to maintain proper spacing and alignment of the apparatus. For example, in the electrolyzer assembly, the first end bushing 112 and second end bushing 114 may be positioned at the top and bottom of a stack of the at least a disc spring 104 to ensure that the at least a disc spring 104 remain evenly spaced and properly aligned. Continuing, this configuration may prevent the springs from shifting or tilting, which could lead to uneven load distribution and mechanical failure. Continuing, the first end bushing 112 and second end bushing 114 may act as precise spacers that keep the at least a disc spring 104 in their intended positions, ensuring consistent performance and reliability.

With continued reference to FIG. 1A-C, the encapsulated disc spring assembly may include multiple structural and functional features that enhance performance, integration, and manufacturability within a next higher assembly. The height of the first end bushing 112 and second end bushing 114 may be configured to provide localized structural thickness to an adjoining endplate, thereby reducing endplate deflection under compressive loads. The encapsulated package may be compression tested as a unit to verify stiffness, deflection, and load characteristics with repeatability across production batches, eliminating the need for inspection of individual at least a disc spring. In one or more embodiments, internal guide bushing 108 may provide a smooth buffer surface along tie rod threads of a next higher assembly, preventing direct interaction between at least a disc spring 104 and tie rod threads during compression. Alternatively, internal guide bushing 108 may be omitted and replaced with a temporary guide fixture during assembly, the fixture being configured to align the at least a disc spring until encapsulation by insulation layer 118. In one or more embodiments, insulation layer 118 may be configured to obscure visual features of the at least a disc spring to prevent reverse engineering of spring size, number, and associated load characteristics, while also providing partial environmental protection to reduce exposure to corrosive agents. In addition, insulation layer 118 may eliminate a need for individual disc spring 104 handling during integration into the next higher assembly and may further enable modular replacement, such that pre-assembled spring modules may be interchanged without disassembly of individual components. Encapsulation of disc spring assembly may further reduce particulate ingress and surface contamination, thereby maintaining consistent frictional characteristics during compression, while permitting non-destructive testing of compression behavior through repeated compression cycling of an insulated package. In one or more embodiments, encapsulated assembly may be configured for batch testing using automated equipment to enable statistical process control of stiffness and deflection values. In one or more embodiments, encapsulated assembly may provide preload management to accommodate dimensional changes of membrane electrode assemblies in an electrolyzer stack during hydration or thermal expansion. In one or more embodiments, apparatus may include an internal guide bushing 108 having a length selected to ensure continuous engagement of at least a disc spring 104 and full capture at both ends by the first end bushing 112 and second end bushing 114 without interference, while an encapsulation may include a uniform radial constraint that reduces variance in load-deflection responses across production lots. In one or more embodiments, an encapsulated assembly may maintain a preload force despite creep, relaxation, or thermal cycling of adjacent structural components in a next higher assembly, thereby ensuring stable long-term operation. In one or more embodiments, a pair of first end bushing 112 and second end bushing 114 may include configurations to interface directly with coolant or gas manifold structures of an electrolyzer, distributing compressive loads while preventing localized deflection. In one or more embodiments, an encapsulated assembly may be provided in different stiffness ratings by varying the number, orientation, or material of at least a disc spring 104 while maintaining standardized outer dimensions, thereby enabling adaptability for multiple operational requirements without redesign of surrounding hardware.

Referring now to FIG. 2, a flow diagram of an exemplary method 200 for encapsulating a disc spring assembly in an insulated package is illustrated. At step 205, method 200 includes inserting an internal guide bushing into a first internal diameter of a first end bushing. This may be implemented as described and with reference to FIGS. 1A-C.

Still referring to FIG. 2, at step 210, method 200 includes stacking at least a disc spring in a cylindrical arrangement onto the internal guide bushing and the first end bushing. This may be implemented as described and with reference to FIGS. 1A-C.

Still referring to FIG. 2, at step 215, method 200 includes positioning a second end bushing at a top of the cylindrical arrangement. This may be implemented as described and with reference to FIGS. 1A-C.

Still referring to FIG. 2, at step 220, method 200 includes encapsulating the cylindrical arrangement of the at least a disc spring, and at least a portion of the first and the second first end bushing and second end bushing in an insulation layer. This may be implemented as described and with reference to FIGS. 1A-C.

Referring now to FIGS. 3A-D, schematic diagrams for encapsulating a disc spring assembly 300 in an insulated package are illustrated. FIGS. 3A-3D collectively depict full views and cross-sectional views of the disc spring assembly during successive stages of the encapsulation process. In FIG. 3A, an internal guide bushing 304 is inserted into a large internal diameter of a first end bushing 308, wherein the end bushing is positioned on a flat surface to provide stability during assembly. In FIG. 3B, at least a disc spring 312 are stacked in a cylindrical arrangement onto the internal guide bushing 304 and the first end bushing 308, with the internal guide bushing 304 centering each disc spring. In FIG. 3C, a second end bushing 316 is positioned on top of the cylindrical stack, the second end bushing 316 having an internal diameter captured on the internal guide bushing. In FIG. 3D, the cylindrical stack of at least a disc spring 312, the internal guide bushing 304, and the first end bushing 308 and the second end bushing 316 are encapsulated within an insulation layer 320 cut to a height corresponding to the stack, after which heat is applied to shrink the insulation layer 320 and constrain the stack.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for encapsulating a disc spring assembly in an insulated package, wherein the apparatus comprises:

at least a disc spring assembled in a cylindrical stack;

an internal guide bushing passing through a center of the at least a disc spring, wherein the internal guide bushing is configured to constrain the at least a disc spring;

a first end bushing and a second end bushing, wherein each of the first end bushing and the second end bushing comprises a circumferential groove, wherein a top portion of the at least a disc spring is abutting against the first end bushing, and wherein a bottom portion of the at least a disc spring is abutting against the second end bushing; and an insulation layer, wherein the insulation layer is configured to encapsulate the at least a disc spring, and at least a portion of the first and the second end bushings.

2. The apparatus of claim 1, wherein the insulation layer comprises an insulative shrink tubing.

3. The apparatus of claim 2, wherein the insulative shrink tubing comprises polyvinyl chloride, polyethylene, and silicone rubber.

4. The apparatus of claim 2, wherein the insulation layer is configured to mitigate sudden release of stored energy in the at least a disc spring.

5. The apparatus of claim 1, wherein the insulation layer is captured by a circumferential groove in the first end bushing and the second end bushing providing a capture force during initial assembly of the at least a disc spring assembly.

6. The apparatus of claim 5, wherein the capture force is resistant to an acceleration of the at least a disc spring assembly.

7. The apparatus of claim 5, wherein the capture force provided by the insulation layer is maintained after repeated compression and decompression cycles and resists lateral loads, vibration, and shocks encountered during shipping, handling, and installation, without materially influencing a compression characteristics of the at least a disc spring.

8. The apparatus of claim 1, wherein the at least a disc spring are configured to manage mechanical loads in a next higher assembly.

9. The apparatus of claim 8, wherein the next higher assembly comprises an electrolyzer assembly.

10. The apparatus of claim 8, wherein the at least a disc spring are configured to provide an operational pressure adjustment in the next higher assembly.

11. The apparatus of claim 8, wherein the at least a disc spring is configured to provide mechanical support under varying thermal conditions in the next higher assembly.

12. The apparatus of claim 8, wherein the apparatus is configured to maintain a preload force despite creep, relaxation, and thermal cycling of adjacent structural components in a next higher assembly.

13. The apparatus of claim 1, wherein the first end bushing and the second end bushing are configured to resist unwanted deflection by compression of the at least a disc spring into a surface of the first end bushing and the second end bushing.

14. The apparatus of claim 1, wherein a length of the internal guide bushing is selected to ensure continuous engagement of at least a disc spring and full capture at both ends by the first end bushing and the second end bushing across an entire compression range of the apparatus and without interference.

15. The apparatus of claim 1, wherein the at least a disc spring, wherein the at least a disc spring is configured to provide a pre-determined load-deflection relationship by achieving a stiffness and a corresponding allowable deflection range based on an orientation of the at least a disc spring.

16. The apparatus of claim 1, wherein the apparatus is configured to ensure uniform radial constraint of the at least a disc spring, and reduce variance in load-deflection response across production lots.

17. The apparatus of claim 1, wherein the at least a disc spring comprises at least a conical disc spring and at least a wave disc spring.

18. The apparatus of claim 1, wherein the internal guide bushing comprises one or more of steel, aluminum, and plastic material.

19. The apparatus of claim 1, wherein the first end bushing and the second end bushing are positioned between the at least a disc spring and a mounting surface and a nut.

20. The apparatus of claim 1, wherein first end bushing and the second end bushing are configured to interface directly with coolant or gas manifold structures of an electrolyzer, and distribute compressive loads while preventing localized deflection.

21. The apparatus of claim 1, wherein the first end bushing and the second end bushing are configured to maintain proper spacing and alignment of the apparatus.

22. The apparatus of claim 1, wherein a height of the first end bushing and the second end bushing is configured to provide localized structural thickness in a next higher assembly endplate.

23. The apparatus of claim 1, wherein the insulated package is configured to be compression tested as a unit to verify stiffness, deflection, and load characteristics with repeatability across production batches, without requiring inspection of at least a disc spring.

24. The apparatus of claim 1, wherein the internal guide bushing provides a smooth buffer surface along tie rod threads of a next higher assembly to prevent direct interaction between the at least a disc spring and the tie rod threads during compression.

25. The apparatus of claim 1, wherein the apparatus is configured for modular replacement within a next higher assembly, allowing for pre-assembled spring modules to be interchanged without disassembling individual components.

26. The apparatus of claim 1, wherein the encapsulation permits non-destructive testing of compression behavior by compression cycling of the apparatus.

27. The apparatus of claim 1, wherein the apparatus is further configured for batch testing by automated equipment, enabling statistical process control of stiffness and deflection values.

28. The apparatus of claim 1, wherein the apparatus provides preload management to accommodate dimensional changes of membrane electrode assemblies in an electrolyzer stack during hydration or thermal expansion.

29. An apparatus for encapsulating a disc spring assembly in an insulated package, wherein the apparatus comprises:

at least a disc spring assembled in a cylindrical stack;

a temporary guide fixture passing through a center of the at least a disc spring, wherein the temporary guide fixture is configured to constrain the at least a disc spring;

a first end bushing and a second end bushing, wherein each of the first end bushing and the second end bushing comprises a circumferential groove, wherein a top portion of the at least a disc spring is abutting against the first end bushing, and wherein a bottom portion of the at least a disc spring is abutting against the second end bushing; and an insulation layer, wherein the insulation layer is configured to encapsulate the at least a disc spring, and at least a portion of the first and the second end bushings.

* * * * *